United States Patent
Liu et al.

(10) Patent No.: US 10,984,149 B2
(45) Date of Patent: Apr. 20, 2021

(54) OPTIMIZATION DESIGN METHOD FOR SPATIAL FLOW PASSAGE OF LOW-PRESSURE EVEN SPRAY NOZZLE

(71) Applicant: Jiangsu University, Zhenjiang (CN)

(72) Inventors: Junping Liu, Zhenjiang (CN); Shouqi Yuan, Zhenjiang (CN); Hong Li, Zhenjiang (CN); Qian Zhang, Zhenjiang (CN); Xingye Zhu, Zhenjiang (CN); Ya Bao, Zhenjiang (CN)

(73) Assignee: Jiangsu University, Jiangsu (CN)

( * ) Notice: Subject to any disclaimer, the term of this patent is extended or adjusted under 35 U.S.C. 154(b) by 433 days.

(21) Appl. No.: 15/771,948

(22) PCT Filed: Jun. 8, 2016

(86) PCT No.: PCT/CN2016/085231
§ 371 (c)(1),
(2) Date: Apr. 27, 2018

(87) PCT Pub. No.: WO2017/143694
PCT Pub. Date: Aug. 31, 2017

(65) Prior Publication Data
US 2019/0251229 A1    Aug. 15, 2019

(30) Foreign Application Priority Data
Feb. 25, 2016   (CN) .......................... 201610103841.4

(51) Int. Cl.
*G06F 30/17*    (2020.01)
*G06F 30/20*    (2020.01)
*G06F 30/00*    (2020.01)

(52) U.S. Cl.
CPC .............. *G06F 30/17* (2020.01); *G06F 30/00* (2020.01); *G06F 30/20* (2020.01)

(58) Field of Classification Search
CPC .......... G06F 30/17; G06F 30/00; G06F 30/20; G06F 2111/06
(Continued)

(56) References Cited

U.S. PATENT DOCUMENTS

| 8,170,849 B2 * | 5/2012 | Schick .................... B05B 12/00 703/6 |
| 2008/0004846 A1 * | 1/2008 | Onozuka ................. G06F 30/20 703/9 |

(Continued)

FOREIGN PATENT DOCUMENTS

| CN | 101799841 A | 8/2010 |
| CN | 103962257 A | 8/2014 |

(Continued)

OTHER PUBLICATIONS

International Search Report for International Application PCT/CN2016/085231, dated Nov. 14, 2016, four (4) pages.

*Primary Examiner* — Juan C Ochoa
(74) *Attorney, Agent, or Firm* — Greenberg Traurig, LLP

(57) ABSTRACT

An optimization design method for a spatial flow passage of a low-pressure even spray nozzle, relating to a design method for an essential apparatus in a water-saving irrigation system, such as a spray irrigation system. Specifically, if the model and the inlet diameter of a nozzle are determined, the shape and the size of the cross section of an outlet, a flow passage deflection angle, the radius and the arc length of a flow passage contour, and the size of an elevation angle of the outlet are determined to implement structural optimization of a spatial flow passage of the nozzle; moreover, parameterization design of the spatial flow passage in different inlet diameter conditions is implemented, so that a method for determining structural parameters of a spatial flow passage of a nozzle is obtained. A design method of a spatial flow passage under a low-pressure operation condi- (Continued)

tion is developed, such that the hydraulic performance of the nozzle is optimized, and the nozzle is efficient and saves energy.

10 Claims, 3 Drawing Sheets

(58) Field of Classification Search
USPC .......................................................... 703/6, 9
See application file for complete search history.

(56) References Cited

U.S. PATENT DOCUMENTS

| | | | |
|---|---|---|---|
| 2011/0077925 A1 | 3/2011 | Vander Griend | |
| 2013/0246011 A1* | 9/2013 | Nikolayev | G06G 7/50 703/1 |
| 2014/0200837 A1* | 7/2014 | Blair | G01N 29/222 702/48 |
| 2014/0367499 A1* | 12/2014 | Odenthal | F27D 3/16 239/589 |

FOREIGN PATENT DOCUMENTS

| | | |
|---|---|---|
| CN | 104268313 A | 1/2015 |
| CN | 105160096 A | 12/2015 |
| WO | 2009073226 A1 | 6/2009 |

* cited by examiner

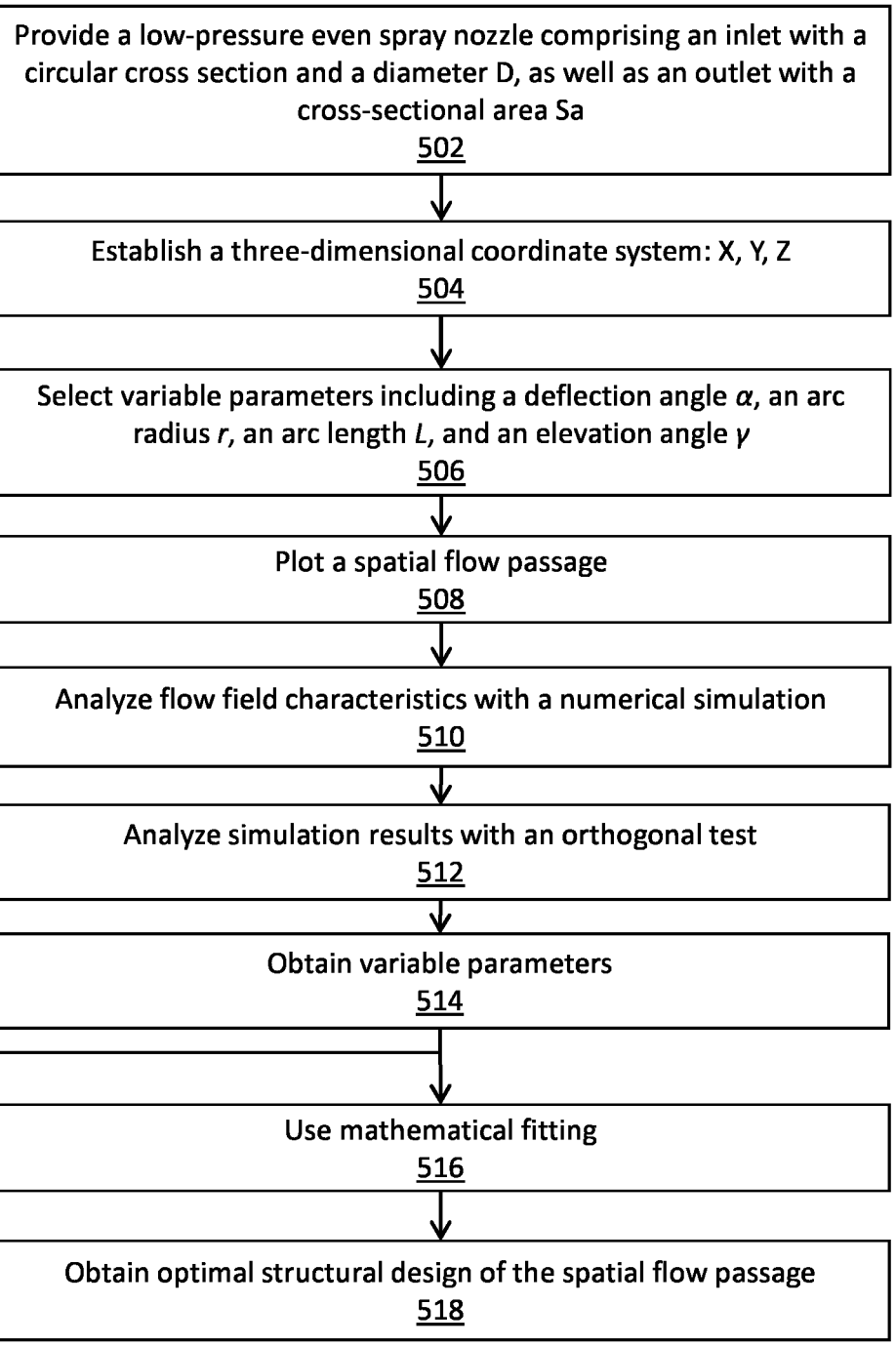

OPTIMIZATION DESIGN METHOD FOR SPATIAL FLOW PASSAGE OF LOW-PRESSURE EVEN SPRAY NOZZLE

CROSS REFERENCE TO RELATED APPLICATIONS

The present application is a 371 U.S. National Stage of International Application No. PCT/CN2016/085231, filed Jun. 8, 2016, entitled "OPTIMIZATION DESIGN METHOD FOR SPATIAL FLOW PASSAGE OF LOW-PRESSURE EVEN SPRAY NOZZLE" which in turn claims priority to Chinese Application 201610103841.4 with the same title filed Feb. 25, 2016, both of which are incorporated herein by reference in its entirety.

TECHNICAL FIELD

The present invention relates to a structural optimization design method for a water-saving irrigation apparatus, particularly to an optimization design method for a spatial flow passage of a low-pressure even spray nozzle.

BACKGROUND ART

China is a great agricultural country with a large population, and is confronted with a severe water shortage problem. Therefore, promoting water-saving irrigation is crucial in the development of agricultural technology in China. The sprinkler irrigation technique is one of efficient water utilization techniques available at present. The irrigation quality of a sprinkler irrigation system depends on the hydraulic performance and operational performance of spray nozzles to a great extent, the spray nozzles are key devices for implementing sprinkler irrigation.

The flow passage of a spray nozzle accomplishes pressure water inflow, turning, energy exchange, and jetting. The structural form, physical dimensions, cross-sectional shape, and surface roughness, etc., of the flow passage have influence on the hydraulic performance of the spray nozzle. In order to reduce internal hydraulic loss in the flow passage of spray nozzle and realize optimization of hydraulic performance, for a small-size low-pressure spray nozzle, a water smashing mechanism is often mounted outside of the nozzle, or a special-shaped nozzle is used, or a tapered cut is worked out at the nozzle, etc., to improve atomization performance of the spray nozzle and increase the water volume near the spray nozzle, but the sprinkling range is often reduced to some extent.

Presently, the structural design in the research mainly focuses on design of auxiliary nozzle, multi-passage technique, water dispersion mechanism, and special-shaped nozzle, etc. However, an optimization design of parameters of spatial flow passage of the spray nozzle can improve hydraulic performance and operating stability of the spray nozzle. Though such an optimization design ought to be regarded as a key concern in the design process, there is few relevant research. In order to solve the above-mentioned problem, the present invention provides a design method for a spatial flow passage of a low-pressure even spray nozzle, so as to overcome the drawbacks of poor evenness and short sprinkling range of spray nozzles in the prior art; in addition, the design method is of far reaching importance for improving the design of flow passages of spray nozzles.

No relevant patent application is found in the patent search carried out by the inventor.

BRIEF SUMMARY OF THE INVENTION

In order to overcome the above-mentioned defects or drawbacks of low-pressure spray nozzles in the prior art, the present invention provides an optimization design method for a spatial flow passage of a low-pressure even spray nozzle, so as to solve the problem of poor water sprinkling evenness of spray nozzles at a low pressure and increase sprinkling range.

In order to attain the object described above, the present invention employs the following technical solution:

An optimization design method for a spatial flow passage of a low-pressure even spray nozzle, comprising the following steps:

step 1: providing a low-pressure even spray nozzle to be optimized, which has an inlet with a circular cross section and a diameter D; and an outlet with cross-sectional area $S_a$; wherein, the contour of a flow passage between the cross section of the inlet and the cross section of the outlet is in an arc shape; the diameter D of the inlet and the cross-sectional area $S_a$ of the outlet are a fixed value respectively;

step 2: establishing a three-dimensional coordinate system, in which a center of circle of the cross section of the inlet is taken as an origin, the vertical direction from the origin is taken as a Y-axis of the coordinate system, a center of circle of the flow passage contour is positioned in a X-axis of the coordinate system, and the tangent point between the flow passage contour and the Y-axis is right located at the origin of the coordinate system;

step 3: selecting variable parameters required for optimization of the spatial flow passage of the low-pressure even spray nozzle, including: deflection angle α of flow passage, arc radius r of flow passage contour, arc length L of flow passage contour, elevation angle γ of outlet, and cross-sectional shape of outlet; wherein, the deflection angle α of flow passage is defined as an included angle between a straight line passing through the center of circle of the cross section of the inlet and the centroid of the cross section of the outlet and the Y-axis; the arc length L of flow passage contour is defined as the length of arc flow passage from the center of circle of the cross section of the inlet to the centroid of the cross section of the outlet; and the elevation angle γ of outlet is defined as an intersection angle between the water flow jetted from the low-pressure even spray nozzle and a horizontal plane;

step 4: plotting a spatial flow passage with different variable parameters described in the step 3 with three-dimensional modeling software;

step 5: analyzing flow field characteristics of the spatial flow passage plotted in the step 4 with different variable parameters with a numerical simulation technique, and analyzing simulation results with an orthogonal test method, to obtain a cross-sectional shape of the outlet and corresponding variable parameters when the sprinkling performance of the low-pressure even spray nozzle is optimal under a condition that the diameter D of the inlet and the cross-sectional area $S_a$ of the outlet are fixed values;

step 6: changing the fixed values of the diameter D of the inlet and the cross-sectional area $S_a$ of the outlet and repeating the above steps, to obtain a number of sets of corresponding different variable parameters when the spatial flow passage of the low-pressure even spray nozzle is optimal on the basis of different sets of fixed values of the diameter D of the inlet and the cross-sectional area $S_a$ of the outlet;

step 7: using a mathematical fitting method to fit the sets of corresponding variable parameters obtained in the step 6 when the spatial flow passage of the low-pressure even spray nozzle is optimal, so as to obtain an optimal structural design of the spatial flow passage of the low-pressure even spray nozzle finally.

Furthermore, after the cross-sectional shape of the outlet and corresponding variable parameters when the sprinkling performance of the low-pressure even sprinkler is optimal are obtained in the step 5, then the spatial flow passage of the low-pressure even spray nozzle is machined according to the cross-sectional shape of the outlet and the variable parameters, and the resultant spatial flow passage is verified by experimental verification, to further prove reliability of the cross-sectional shape of the outlet and corresponding variable parameters obtained in the step 5.

Furthermore, in the step 6, in view of product uniformity and machining difficulty, after the fixed values of the diameter D of the inlet and the cross-sectional area $S_a$ of the outlet are changed, the cross-sectional shape of the outlet is no longer treated as a variable parameter, i.e., the cross-sectional shape of the outlet obtained when the sprinkling performance of the low-pressure even spray nozzle is optimal in the step 5 is kept.

Furthermore, in the step 4, when the contour of the spatial flow passage is plotted under different variable parameters, six different outlet shapes, i.e., shape A, shape B, shape C, shape D, shape E, and shape F, are selected for the cross-sectional shape of the outlet; the value range of the deflection angle α of flow passage is determined as 4°~7°; the value range of the radius r of flow passage contour is determined as 22~24 mm; the value range of the arc length L of flow passage contour is determined as 26~30 mm; and the value range of the elevation angle γ of outlet is determined as 28°~32°.

Furthermore, in the step 1, the initial value of the diameter D of the inlet is set to 5.6 mm; the initial value of the cross-sectional area $S_a$ of the outlet is set to 19.5 mm²; when the spatial sprinkling performance of the low-pressure even spray nozzle is optimal the variable parameters obtained in the step 5 are: deflection angle α=5.5°, radius r of flow passage contour=23 mm, arc length L of flow passage contour=28 mm, elevation angle γ of outlet=30°; the cross-sectional shape of the outlet is shape A; the shape A consists of a first quadrant, a second quadrant, a third quadrant, and a fourth quadrant the area $S_1$ in the first quadrant is 4.1 mm², the area $S_2$ in the second quadrant is 5.5 mm², the area $S_3$ in the third quadrant is 4.9 mm², and the area $S_4$ in the fourth quadrant is 5.0 mm².

Furthermore, in the step 6, the diameter D of the inlet is set to 4.8 mm, 5.2 mm, 6.0 mm, and 6.4 mm respectively, and the corresponding cross-sectional area $S_a$ of the outlet is set to 16.7 mm², 18.1 m², 20.9 m², and 22.3 m² respectively; the cross-section shape of the outlet is shape A, and then in the case of the diameter of the inlet is 4.8 mm, the optimal structural parameters of the spatial flow passage are: the deflection angle α of the flow passage in the circumferential direction is 5.2°, the radius r of the flow passage contour is 22 mm, the arc length L is 25.5 mm, the elevation angle γ of the outlet is 28°, the area $S_1$ in the first quadrant is 3.5 mm², the area $S_2$ in the second quadrant is 4.7 mm², the area $S_3$ in the third quadrant is 4.2 mm², and the area $S_4$ in the fourth quadrant is 4.3 mm²; in the case of the diameter of the inlet is 5.2 mm, the optimal structural parameters of the spatial flow passage are: the deflection angle α of flow passage in the circumferential direction is 5.4°, the radius r of flow passage contour is 22.5 mm, the arc length L is 27 mm, the elevation angle γ of outlet is 32°, the area $S_1$ in the first quadrant is 3.8 mm², the area $S_2$ in the second quadrant is 5.1 mm², the area $S_3$ in the third quadrant is 4.6 mm², and the area $S_4$ in the fourth quadrant is 4.6 mm²; in the case of the diameter of the inlet is 6.0 mm, the optimal structural parameters of the spatial flow passage are: the deflection angle α of flow passage in the circumferential direction is 5.6°, the radius r of flow passage contour is 23.5 mm, the arc length L is 28.5 mm, the elevation angle γ of outlet is 30°, the area $S_1$ in the first quadrant is 4.3 mm², the area $S_2$ in the second quadrant is 5.9 mm², the area $S_3$ in the third quadrant is 5.3 mm², and the area $S_4$ in the fourth quadrant is 5.4 mm²; in the case of the diameter of the inlet is 6.4 mm, the optimal structural parameters of the spatial flow passage are: the deflection angle α of flow passage in the circumferential direction is 5.8°, the radius r of flow passage contour is 24 mm, the arc length L is 28.5 mm, the elevation angle γ of outlet is 28°, the area $S_1$ in the first quadrant is 4.6 mm², the area $S_2$ in the second quadrant is 6.3 mm², the area $S_3$ in the third quadrant is 5.7 mm², and the area $S_4$ in the fourth quadrant is 5.7 mm².

Furthermore, the optimal structural design of the spatial flow passage of the spray nozzle obtained in the step 7 meets the following criterion:

$$\begin{cases} \alpha = (1.0 - 1.1)\left(\dfrac{D}{D_0}\right)^{0.35} \alpha_0 \\ r = 1.25D + 16 \\ L = -1.5625D^2 + 19.375D - 31.5 \\ \gamma = 28° - 32° \end{cases}$$

The cross-sectional shape of the outlet is shape A; the area $S_1$ in the first quadrant of the cross section of the outlet, the area $S_2$ in the second quadrant, the area $S_3$ in the third quadrant, and the area $S_4$ in the fourth quadrant meet:

$$\begin{cases} \dfrac{S_a}{S_{a0}} = \dfrac{D}{D_0} \\ \dfrac{S_1}{S_2} = 0.735, \dfrac{S_3}{S_2} = 0.899, \dfrac{S_4}{S_2} = 0.903 \end{cases}$$

Wherein, D is the diameter of the inlet, in unit of mm, $D_0$ is an initial value set for the diameter D of inlet in the step 1, and $D_0$=5.6 mm; α is the deflection angle of the flow passage, in unit of degree (°); $S_a$ is the cross-sectional area of the outlet, in unit of mm², and $S_{a0}$ is an initial value set for the cross-sectional area $S_a$ of outlet in the step 1, and $S_{a0}$=19.5 mm².

Technical Benefits of the present invention: A novel spatial flow passage of low-pressure even spray nozzle is designed and optimized, and thereby the hydraulic performance of the spray nozzle is optimized, and the spray nozzle is efficient and energy-saving.

DESCRIPTION OF DRAWINGS

FIG. 5 is a flow diagram illustrating an optimization design method for a spatial flow passage of a low-pressure even spray nozzle.

Figure 1:
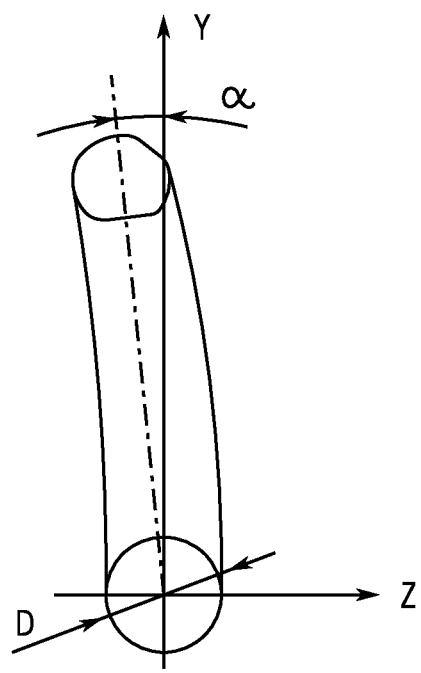
FIG. 1 is a schematic structural diagram of the spatial flow passage in Y-axis and Z-axis directions.
Figure 2:
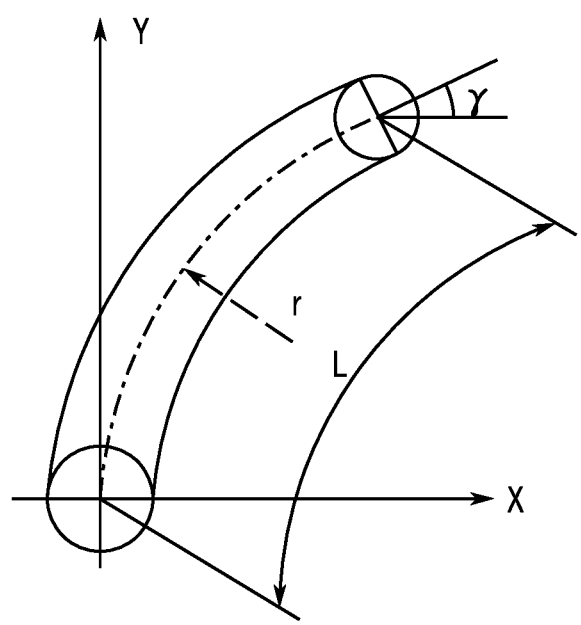
FIG. 2 is a schematic structural diagram of the spatial flow passage in Y-axis and X-axis directions.
Figure 3:
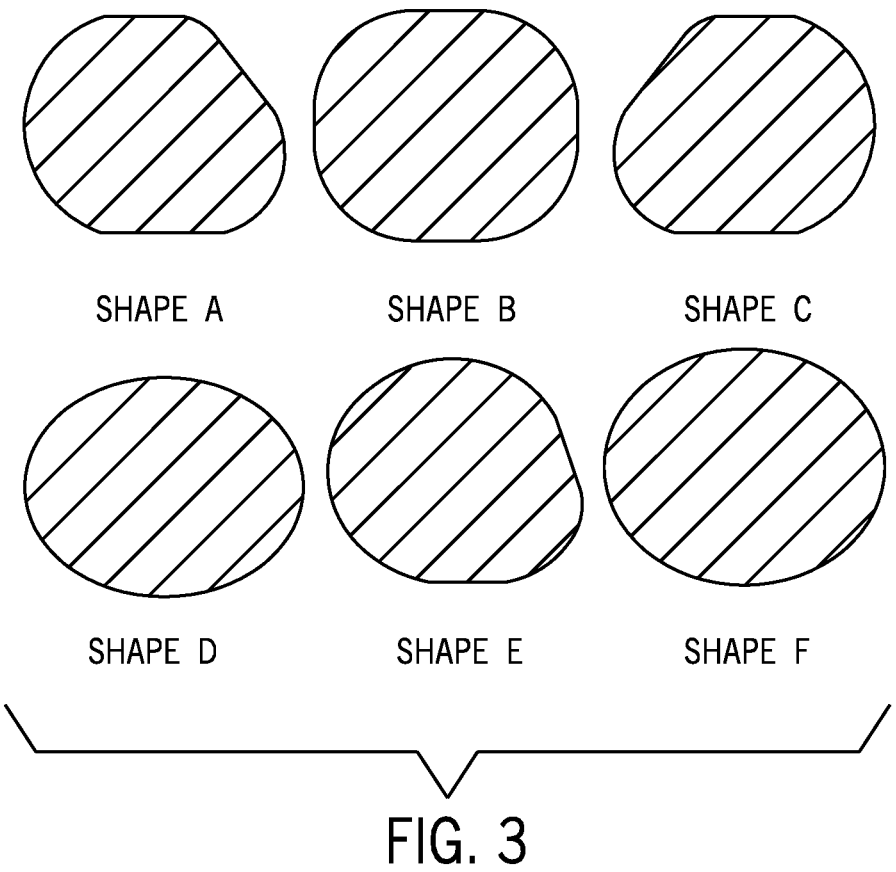
FIG. 3 is a schematic diagram of six different shapes of the cross section of spray nozzle outlet.
Figure 4:
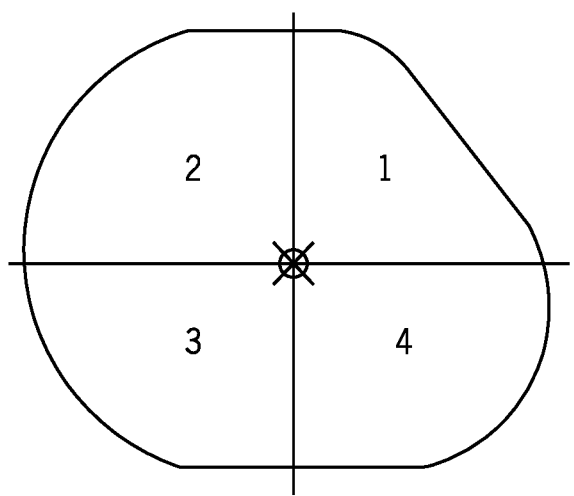
FIG. 4 is a schematic structural diagram of the cross-sectional shape of the spray nozzle outlet consisting of areas in four quadrants.

In the figures: 1—area $S_1$ in the first quadrant; 2—area $S_2$ in the second quadrant; 3—area $S_3$ in the third quadrant; 4—area $S_4$ in the fourth quadrant

DETAILED DESCRIPTION OF THE INVENTION

The technical concept of the present invention is to change the structural parameters of the spatial flow passage of a spray nozzle and thereby attain a purpose of optimizing hydraulic performance of the spray nozzle operating under a low pressure condition. Hereunder the technical solution in the present invention will be further detailed with reference to FIGS. 1, 2, 3, and 4.

The novel optimization design method for a spatial flow passage of a low-pressure even spray nozzle provided in this embodiment mainly comprises:

Step 1: Determining the Model of a Spray Nozzle

The model of a spray nozzle is mainly determined by the diameter of inlet. Here, the diameter D of inlet of the spray nozzle is set to 5.6 mm according to the requirement in this embodiment. The cross-sectional area of the outlet of the spray nozzle is an important factor that has direct influence on the evenness of sprinkler irrigation. The cross-sectional area S of the outlet of this spray nozzle model is 19.5 $mm^2$. Six different outlet shapes are plotted, including 3 irregular shapes and 3 regular shapes (shown in FIG. 3), i.e., shape A, shape B, shape C, shape D, shape E, and shape F, and comparison tests are carried out;

Step 2: a three-dimensional coordinate system is established, in which a center of circle of the cross section of the inlet is taken as an origin, the vertical direction from the origin is taken as a Y-axis of the coordinate system, a center of circle of the flow passage contour is positioned in a X-axis of the coordinate system, and the tangent point between the flow passage contour and the Y-axis is right located at the origin of the coordinate system;

Step 3: variable parameters required for optimization of the spatial flow passage of the low-pressure even spray nozzle are selected, including: deflection angle $\alpha$ of flow passage, arc radius r of flow passage contour, arc length L of flow passage contour, elevation angle $\gamma$ of outlet, and cross-sectional shape of outlet (in this embodiment, six different cross-sectional shapes are selected); wherein, the deflection angle $\alpha$ of flow passage is defined as an included angle between a straight line formed by passing through the center of circle of the cross section of the inlet and the centroid of the cross section of the outlet and the Y-axis; the arc length L of flow passage contour is defined as the length of arc flow passage from the center of circle of the cross section of the inlet to the centroid of the cross section of the outlet; and the elevation angle $\gamma$ of outlet is defined as an intersection angle between the water flow jetted from the low-pressure even spray nozzle and a horizontal plane; the selection is made on the following bases: in view that the water flow generates a rotational driving moment against the internal wall surface of the flow passage and drives the spray nozzle to rotate owing to the existence of a deflection angle $\alpha$ of flow passage, the deflection angle $\alpha$ of flow passage is taken as an important parameter for evaluating operating stability of the spray nozzle; the arc radius r and arc length L are also important factors that have great influence on the direction of water flow jetted from the spray nozzle as well as the jet flow speed at the outlet; the elevation angle $\gamma$ of outlet has influence on the sprinkling range of the spray nozzle by affecting the direction of the jet flow from the outlet.

Step 4: Based on the design experience on spatial flow passages of low-pressure even spray nozzles, the value range of the deflection angle $\alpha$ of flow passage is usually 4°~7°. The value range of the radius r of flow passage contour is determined as 22~24 mm. In order to allow the movement of the water flow in the flow passage to develop fully, the arc length L of flow passage contour is increased slightly on the basis of the dimension determined in the empirical design, and is set to 26~30 mm. The value range of the elevation angle $\gamma$ of outlet is set to 28°~32°, which can ensure a maximum sprinkling range of the spray nozzle.

Step 5: Three-dimensional structural diagrams of spatial flow passage are plotted according to empirical design values of the parameters described in the step 4 and the six different given cross-sectional shapes; thus, combinations of different structural parameters of the spray nozzle shown in Table 1 are obtained; then, schematic structural diagrams of the flow passage are plotted with three-dimensional modeling software.

TABLE 1

Structural Parameters of Spatial Flow Passage

| Cross-Sectional Shape of Outlet | Deflection Angle $\alpha$ of Flow Passage (°) | Radius r of Flow Passage Contour (mm) | Arc Length L of Flow Passage Contour (mm) | Elevation Angle $\gamma$ of Outlet (°) |
|---|---|---|---|---|
| a | 4 | 22 | 26 | 28 |
| a | 5.5 | 23 | 28 | 30 |
| a | 7 | 24 | 30 | 32 |
| b | 4 | 22 | 26 | 28 |
| b | 5.5 | 23 | 28 | 30 |
| b | 7 | 24 | 30 | 32 |
| c | 4 | 22 | 26 | 28 |
| c | 5.5 | 23 | 28 | 30 |
| c | 7 | 24 | 30 | 32 |
| d | 4 | 22 | 26 | 28 |
| d | 5.5 | 23 | 28 | 30 |
| d | 7 | 24 | 30 | 32 |
| e | 4 | 22 | 26 | 28 |
| e | 5.5 | 23 | 28 | 30 |
| e | 7 | 24 | 30 | 32 |
| f | 4 | 22 | 26 | 28 |
| f | 5.5 | 23 | 28 | 30 |
| f | 7 | 24 | 30 | 32 |

Step 6: Preselecting Optimization Solution

Numerical simulation and calculation is carried out for the different spatial flow passages plotted according to the Table 1, and the simulation results are analyzed with an orthogonal test method, to obtain a preselected optimization solution: the deflection angle $\alpha$ of flow passage in the circumferential direction is 5.5°, the radius r of flow passage contour is 23 mm, the arc length L is 28 mm, the elevation angle $\gamma$ of outlet is 30°; an optimal structural shape of the cross section of the outlet is a shape A as shown in FIG. 3, wherein, the shape A consists of a first quadrant, a second quadrant, a third quadrant, and a fourth quadrant, and the area $S_1$ in the first quadrant is 4.1 $mm^2$, the area $S_2$ in the second quadrant is 5.5 $mm^2$, the area $S_3$ in the third quadrant is 4.9 $mm^2$, and the area $S_4$ in the fourth quadrant is 5.0 $mm^2$.

Step 7: Experimental Verification

Spatial flow passages obtained with a number of typical parametric combinations are machined and tested, to verify accuracy of simulation. The results are in line with the results obtained in numerical simulation, i.e., the optimal structural dimensions are: the deflection angle $\alpha$ of flow passage in the circumferential direction is 5.5°, the radius r of flow passage contour is 23 mm, the arc length L is 28 mm, and the elevation angle γ of outlet is 30°; the cross-sectional shape of the outlet is the shape A as shown in FIG. 3. It is verified in experiments and tests: the evenness of sprinkler irrigation after parameter optimization is higher than that before optimization, the water distribution is more reasonable, and the sprinkling range of the spray nozzle is increased by about 20%, as shown in Table 2.

TABLE 2

Comparison of Sprinkler Irrigation Performance before and after Parameter Optimization

|  | Evenness of Sprinkler Irrigation Cu (%) | Sprinkling Range R (mm) |
| --- | --- | --- |
| Before optimization | 70.2 | 10 |
| After optimization | 76.8 | 12 |

Step 8: Values of diameter D of outlets of different models of spray nozzles are selected, i.e., 4.8 mm, 5.2 mm, 6.0 mm, and 6.4 mm, and corresponding values of cross-sectional area $S_a$ of outlet are selected respectively, i.e., 16.7 mm², 18.1 mm², 20.9 mm², and 22.3 mm²; in view of product uniformity and machining difficulty, the cross-sectional area of outlet is no longer treated as a variable parameter in this step, i.e., the shape A is still employed; the above-mentioned steps are repeated, to determine optimal combinations of structural parameters of spatial flow passages of different spray nozzle models. In the case of the diameter of the inlet is 4.8 mm, the optimal structural parameters of the spatial flow passage are: the deflection angle α of flow passage in the circumferential direction is 5.2°, the radius r of flow passage contour is 22 mm, the arc length L is 25.5 mm, the elevation angle γ of outlet is 28°, the area $S_1$ in the first quadrant is 3.5 mm², the area $S_2$ in the second quadrant is 4.7 mm², the area $S_3$ in the third quadrant is 4.2 mm², and the area $S_4$ in the fourth quadrant is 4.3 mm². In the case of the diameter of the inlet is 5.2 mm, the optimal structural parameters of the spatial flow passage are: the deflection angle α of flow passage in the circumferential direction is 5.4°, the radius r of flow passage contour is 22.5 mm, the arc length L is 27 mm, the elevation angle γ of outlet is 32°, the area $S_1$ in the first quadrant is 3.8 mm², the area $S_2$ in the second quadrant is 5.1 mm², the area $S_3$ in the third quadrant is 4.6 mm², and the area $S_4$ in the fourth quadrant is 4.6 mm²; in the case of the diameter of the inlet is 6.0 mm, the optimal structural parameters of the spatial flow passage are: the deflection angle α of flow passage in the circumferential direction is 5.6°, the radius r of flow passage contour is 23.5 mm, the arc length L is 28.5 mm, the elevation angle γ of outlet is 30°, the area $S_1$ in the first quadrant is 4.3 mm², the area $S_2$ in the second quadrant is 5.9 mm², the area $S_3$ in the third quadrant is 5.3 mm², and the area $S_4$ in the fourth quadrant is 5.4 mm². In the case of the diameter of the inlet is 6.4 mm, the optimal structural parameters of the spatial flow passage are: the deflection angle α of flow passage in the circumferential direction is 5.8°, the radius r of flow passage contour is 24 mm, the arc length L is 28.5 mm, the elevation angle γ of outlet is 28°, the area $S_1$ in the first quadrant is 4.6 mm², the area $S_2$ in the second quadrant is 6.3 mm², the area $S_3$ in the third quadrant is 5.7 mm², and the area $S_4$ in the fourth quadrant is 5.7 mm². By means of data fitting, finally optimal design parameters of the spatial flow passage of spray nozzle are obtained, which shall meet:

$$\begin{cases} \alpha = (1.0 - 1.1)\left(\dfrac{D}{D_0}\right)^{0.35} \alpha_0 \\ r = 1.25D + 16 \\ L = -1.5625D^2 + 19.375D - 31.5 \\ \gamma = 28° - 32° \end{cases}$$

$$\begin{cases} \dfrac{S_a}{S_{a0}} = \dfrac{D}{D_0} \\ \dfrac{S_1}{S_2} = 0.735, \dfrac{S_3}{S_2} = 0.899, \dfrac{S_4}{S_2} = 0.903 \end{cases}$$

Wherein, D is the diameter of the inlet, in unit of mm, $D_0$ is an initial value set for the diameter D of inlet in the step 1, and $D_0$=5.6 mm; α is the deflection angle of the flow passage, in unit of degree (°); $S_a$ is the cross-sectional area of the outlet, in unit of mm², and $S_{a0}$ is an initial value set for the cross-sectional area $S_a$ of outlet in the step 1, and $S_{a0}$=19.5 mm².

FIG. 5 is a flow diagram illustrating an optimization design method 500 for a spatial flow passage of a low-pressure even spray nozzle. The optimization design method 500 includes providing a low-pressure even spray nozzle comprising an inlet with a circular cross section and a diameter D at a step 502. The low-pressure even spray nozzle further comprises an outlet with a cross-sectional area Sa. At a step 504, a three-dimensional coordinate system with an x-axis, y-axis, and z-axis is established. At a step 506, variable parameters are selected including a deflection angle α, an arc radius r, an arc length L, and an elevation angle γ. At a step 508, the spatial flow passage for the low-pressure even spray nozzle is plotted. At a step 510, flow field characteristics are analyzed with a numerical simulation. At a step 512, the simulation results are analyzed with an orthogonal test. At a step 514, the variable parameters are obtained based the analysis of the simulation results from the step 512. Fixed values of the diameter D of the inlet and the cross-sectional area Sa of the outlet may be changed and steps 502, 504, 506, 508, 510, 512, and 514 may be repeated with the changed fixed values to obtain a number of sets of corresponding different variable parameters. At a step 516, mathematical fitting is used to fit the number of sets of variable parameters to obtain an optimal structural design of the spatial flow passage at a step 518.

We claim:

1. An optimization design method for a spatial flow passage of a low-pressure even spray nozzle, comprising the following steps:
  providing the low-pressure even spray nozzle comprising:
    an inlet with a circular cross section and a diameter D; and
    an outlet with cross-sectional area Sa;
  wherein, the contour of a flow passage between the cross section of the inlet and the cross section of the outlet is in an arc shape; the diameter D of the inlet and the cross-sectional area Sa of the outlet are a fixed value respectively;
  establishing a three-dimensional coordinate system, in which a center of circle of the cross section of the inlet is taken as an origin, the vertical direction from the origin is taken as a Y-axis of the coordinate system, a center of circle of the flow passage contour is positioned in a X-axis of the coordinate system, and the tangent point between the flow passage contour and the Y-axis is right located at the origin of the coordinate system;

selecting variable parameters required for optimization of the spatial flow passage of the low-pressure even spray nozzle, including:
  deflection angle α of flow passage,
  arc radius r of flow passage contour,
arc length L of flow passage contour,
elevation angle γ of outlet, and
cross-sectional shape of outlet;

wherein, the deflection angle α of flow passage is defined as an included angle between a straight line formed by passing through the center of circle of the cross section of the inlet and the centroid of the cross section of the outlet and the Y-axis; the arc length L of flow passage contour is defined as the length of arc flow passage from the center of circle of the cross section of the inlet to the centroid of the cross section of the outlet; and the elevation angle γ of outlet is defined as an intersection angle between the water flow jetted from the low-pressure even spray nozzle and a horizontal plane;

plotting the spatial flow passage with different variable parameters with three-dimensional modeling software;

analyzing flow field characteristics of the spatial flow passage with the different variable parameters with a numerical simulation technique;

analyzing simulation results with an orthogonal test method, to obtain a cross-sectional shape of the outlet and corresponding variable parameters when a sprinkling performance of the low-pressure even spray nozzle is optimal under a condition that the diameter D of the inlet and the cross-sectional area Sa of the outlet are fixed values;

changing the fixed values of the diameter D of the inlet and the cross-sectional area Sa of the outlet and repeating the above steps, to obtain a number of sets of corresponding different variable parameters when the spatial flow passage of the low-pressure even spray nozzle is optimal on the basis of different sets of fixed values of the diameter D of the inlet and the cross-sectional area Sa of the outlet;

using a mathematical fitting method to fit the number of sets of variable parameters obtained when the spatial flow passage of the low-pressure even spray nozzle is optimal, so as to obtain an optimal structural design of the spatial flow passage of the low-pressure even spray nozzle finally.

2. The optimization design method for the spatial flow passage of the low-pressure even spray nozzle according to claim 1, wherein, when the sprinkling performance of the low-pressure even spray nozzle is optimal the cross-sectional shape of the outlet and corresponding variable parameters are obtained, the spatial flow passage of the low-pressure even spray nozzle is machined according to the cross-sectional shape of the outlet and the variable parameters, and the resultant spatial flow passage is verified by experimental verification, to further prove reliability of the cross-sectional shape of the outlet and corresponding variable parameters obtained.

3. The optimization design method for the spatial flow passage of the low-pressure even spray nozzle according to claim 2, wherein in view of product uniformity and machining difficulty, after the fixed values of the diameter D of the inlet and the cross-sectional area Sa of the outlet are changed, the cross-sectional shape of the outlet is no longer treated as a variable parameter, such that the cross-sectional shape of the outlet obtained when the sprinkling performance of the low-pressure even spray nozzle is optimal is kept.

4. The optimization design method for the spatial flow passage of the low-pressure even spray nozzle according to claim 3, wherein, when the contour of the spatial flow passage is plotted with different variable parameter, six different outlet shapes, i.e., shape A, shape B, shape C, shape D, shape E, and shape F, are selected for the cross-sectional shape of the outlet;

the value range of the deflection angle α of flow passage is determined as 4° to 7°;

the value range of the radius r of flow passage contour is determined as 22 to 24 mm;

the value range of the arc length L of flow passage contour is determined as 26 to 30 mm; and the value range of the elevation angle γ of outlet is determined as 28° to 32°.

5. The optimization design method for the spatial flow passage of the low-pressure even spray nozzle according to claim 4, wherein, the initial value of the diameter D of the inlet is set to 5.6 mm; the initial value of the cross-sectional area Sa of the outlet is set to 19.5 $mm^2$;

the variable parameters obtained when the spatial sprinkling performance of the low-pressure even spray nozzle is optimal are:

deflection angle α=5.5°,
radius r of flow passage contour=23 mm,
arc length L of flow passage contour=28 mm,
elevation angle γ of outlet=30°; and
the cross-sectional shape of the outlet is shape A;

wherein the shape A consists of a first quadrant, a second quadrant, a third quadrant, and a fourth quadrant, and the area S1 in the first quadrant is 4.1 $mm^2$,
the area S2 in the second quadrant is 5.5 $mm^2$,
the area S3 in the third quadrant is 4.9 $mm^2$, and
the area S4 in the fourth quadrant is 5.0 $mm^2$.

6. The optimization design method for the spatial flow passage of the low-pressure even spray nozzle according to claim 5, wherein, the diameter D of the inlet is set to 4.8 mm, and the corresponding cross-sectional area Sa of the outlet is set to 16.7 $mm^2$;

the cross-section shape of the outlet is shape A, wherein the optimal structural parameters of the spatial flow passage are:

the deflection angle α of the spatial flow passage in the circumferential direction is 5.2°,
the radius r of the spatial flow passage contour is 22 mm,
the arc length L is 25.5 mm,
the elevation angle γ of the outlet is 28°,
the area S1 in the first quadrant is 3.5 $mm^2$,
the area S2 in the second quadrant is 4.7 $mm^2$,
the area S3 in the third quadrant is 4.2 $mm^2$, and
the area S4 in the fourth quadrant is 4.3 $mm^2$.

7. The optimization design method for the spatial flow passage of the low-pressure even spray nozzle according to claim 6, wherein, the optimal structural design of the spatial flow passage of the low-pressure even spray nozzle obtained meets the following criterion:

the cross-sectional shape of the outlet is shape A; the area S1 in the first quadrant of the cross section of the outlet, the area S2 in the second quadrant, the area S3 in the third quadrant, and the area S4 in the fourth quadrant meet:

wherein, D is the diameter of the inlet, in unit of mm, D0 is the fixed value initially set for the diameter D of inlet, and D0=5.6 mm; α is the deflection angle of the spatial flow passage, in unit of degree)(°; Sa is the cross-sectional area of the outlet, in unit of mm², and Sa0 is an fixed value initially set for the cross-sectional area Sa of outlet, and Sa0=19.5 mm².

8. The optimization design method for the spatial flow passage of the low-pressure even spray nozzle according to claim 5, wherein, the diameter D of the inlet is set to 5.2 mm, and the corresponding cross-sectional area Sa of the outlet is set to 18.1 mm²;
the cross-section shape of the outlet is shape A, wherein the optimal structural parameters of the spatial flow passage are:
the deflection angle α of flow passage in the circumferential direction is 5.4°,
the radius r of flow passage contour is 22.5 mm,
the arc length L is 27 mm,
the elevation angle γ of outlet is 32°,
the area S1 in the first quadrant is 3.8 mm²,
the area S2 in the second quadrant is 5.1 mm²,
the area S3 in the third quadrant is 4.6 mm², and
the area S4 in the fourth quadrant is 4.6 mm².

9. The optimization design method for the spatial flow passage of the low-pressure even spray nozzle according to claim 5, wherein, the diameter D of the inlet is set to 6.0 mm, and the corresponding cross-sectional area Sa of the outlet is set to 20.9 mm²;
the cross-section shape of the outlet is shape A, wherein the optimal structural parameters of the spatial flow passage are:
in the case of the diameter of the inlet is 6.0 mm, the optimal structural parameters of the spatial flow passage are:
the deflection angle α of flow passage in the circumferential direction is 5.6°,
the radius r of flow passage contour is 23.5 mm,
the arc length L is 28.5 mm,
the elevation angle γ of outlet is 30°,
the area S1 in the first quadrant is 4.3 mm²,
the area S2 in the second quadrant is 5.9 mm²,
the area S3 in the third quadrant is 5.3 mm², and
the area S4 in the fourth quadrant is 5.4 mm².

10. The optimization design method for the spatial flow passage of the low-pressure even spray nozzle according to claim 5, wherein, the diameter D of the inlet is set to 6.4 mm respectively, and the corresponding cross-sectional area Sa of the outlet is set to 22.3 mm²;
the cross-section shape of the outlet is shape A, wherein the optimal structural parameters of the spatial flow passage are:
in the case of the diameter of the inlet is 6.4 mm, the optimal structural parameters of the spatial flow passage are:
the deflection angle α of flow passage in the circumferential direction is 5.8°,
the radius r of flow passage contour is 24 mm,
the arc length L is 28.5 mm,
the elevation angle γ of outlet is 28°,
the area S1 in the first quadrant is 4.6 mm²,
the area S2 in the second quadrant is 6.3 mm²,
the area S3 in the third quadrant is 5.7 mm², and
the area S4 in the fourth quadrant is 5.7 mm².

\* \* \* \* \*